(12) United States Patent
Engwall et al.

(10) Patent No.: US 6,168,358 B1
(45) Date of Patent: *Jan. 2, 2001

(54) HYBRID LAY-UP TOOL

(75) Inventors: Dwight L. Engwall; Chris J. Morrow; Kevin J. Steen; Roger A. Johnson, all of Wichita, KS (US)

(73) Assignee: The Boeing Company, Seattle, WA (US)

(*) Notice: Under 35 U.S.C. 154(b), the term of this patent shall be extended for 0 days.

This patent is subject to a terminal disclaimer.

(21) Appl. No.: 09/408,295

(22) Filed: Sep. 29, 1999

Related U.S. Application Data

(60) Division of application No. 09/072,716, filed on May 5, 1998, now Pat. No. 6,012,883, and a continuation-in-part of application No. 08/629,120, filed on Apr. 6, 1996, now Pat. No. 5,746,553.
(60) Provisional application No. 60/045,742, filed on May 6, 1997.

(51) Int. Cl.[7] ..................................................... B23C 3/00
(52) U.S. Cl. ...................... 409/219; 269/289 R; 409/225
(58) Field of Search ................................ 409/132, 197, 409/219, 225; 269/289 R, 329

(56) References Cited

U.S. PATENT DOCUMENTS 4,063,705   12/1977   Vodra .

(List continued on next page.)

OTHER PUBLICATIONS

SME Technical Paper EM91–232 "Bismaleimide Tooling for 350° F. Application" by Robert Vale dated Jun. 3, 1991.

* cited by examiner

*Primary Examiner*—Daniel W. Howell
(74) *Attorney, Agent, or Firm*—John C. Hammar

(57) ABSTRACT

A hybrid tool serves as a form on which constituent materials are applied for bonding or curing into a part in a desired configuration. It also serves as a holder for the bonded or cured materials in the originally applied position during subsequent machining. The hybrid tool is made by fabricating a face sheet of composite material having a facing surface configured to the reverse of a desired shape of one surface of a part to be made on the tool. The actual part will be laid up on the facing surface, cured while on the tool, and even trimmed before release. Base structure of the tool holds the facing surface of the face sheet in the desired shape, and includes ground-engaging pads that define an "A" datum plane. The tool aligns a reference plane of the face sheet parallel to the datum plane. A substantially continuous groove in the face sheet, used for trimming the part, opens in the facing surface. Edge trimming of the part on the tool is performed using a CNC machine tool following a part program to move a cutter extending into the groove to engage the full thickness of the part. The groove corresponds in space to the position represented by the cutter path of travel in the part program because of the accurate spatial relationship of the face sheet reference plane and the datum plane. One embodiment of the invention includes filling the groove in the facing surface with a foaming, self-skinning sacrificial material and covering the facing surface of the tool with a caul sheet. The tool is heated to cure the foaming material, which fills the groove and forms a hard, smooth surface skin, flush with the facing surface of the tool to support the part during lay up. A series of skin plies are laid-up to form a tool-side skin, and other components of the part are laid-up on the tool-side skin. A vacuum bag is sealed to peripheral regions of the facing surface of the tool around the laid-up skin and components. An adhesive/resin matrix in the skin and components is bonded/cured in the conventional manner within the vacuum bag to produce a rigid integral assembly. The vacuum bag is removed, uncovering the rigid integral assembly for trimming. A cutter of a machine tool is guided on a predetermined path around the facing surface of the tool, running in the foam-filled groove below the facing surface of the tool and cutting a peripheral edge around the rigid integral assembly. After trimming, the rigid integral assembly is removed from the facing surface of the tool.

11 Claims, 15 Drawing Sheets

U.S. PATENT DOCUMENTS

| | | |
|---|---|---|
| 4,475,976 | 10/1984 | Mittelstadt et al. . |
| 4,554,036 | 11/1985 | Newsom . |
| 4,664,737 | 5/1987 | Schlosstein . |
| 4,786,351 | 11/1988 | Elliott et al. . |
| 4,882,118 | 11/1989 | Megarry . |
| 4,907,479 | 3/1990 | Nasu . |
| 5,071,338 | 12/1991 | Dublinski et al. . |
| 5,071,503 | 12/1991 | Berman . |
| 5,100,255 | 3/1992 | Rule et al. . |
| 5,126,000 | 6/1992 | Takai et al. . |
| 5,145,297 | 9/1992 | McGrath, Jr. . |
| 5,242,523 | 9/1993 | Willden et al. . |
| 5,368,807 | 11/1994 | Lindsay . |
| 5,382,150 | 1/1995 | Henrio . |
| 5,403,537 | 4/1995 | Seal et al. . |
| 5,454,895 | 10/1995 | Imparato . |
| 5,487,854 | 1/1996 | Leoni . |
| 5,601,852 | 2/1997 | Seemann . |
| 5,624,512 | 4/1997 | Boszor . |
| 5,716,488 | 2/1998 | Bryant . |
| 5,746,553 | 5/1998 | Engwall . |
| 6,012,883 * | 1/2000 | Engwall et al. ............... 409/132 |

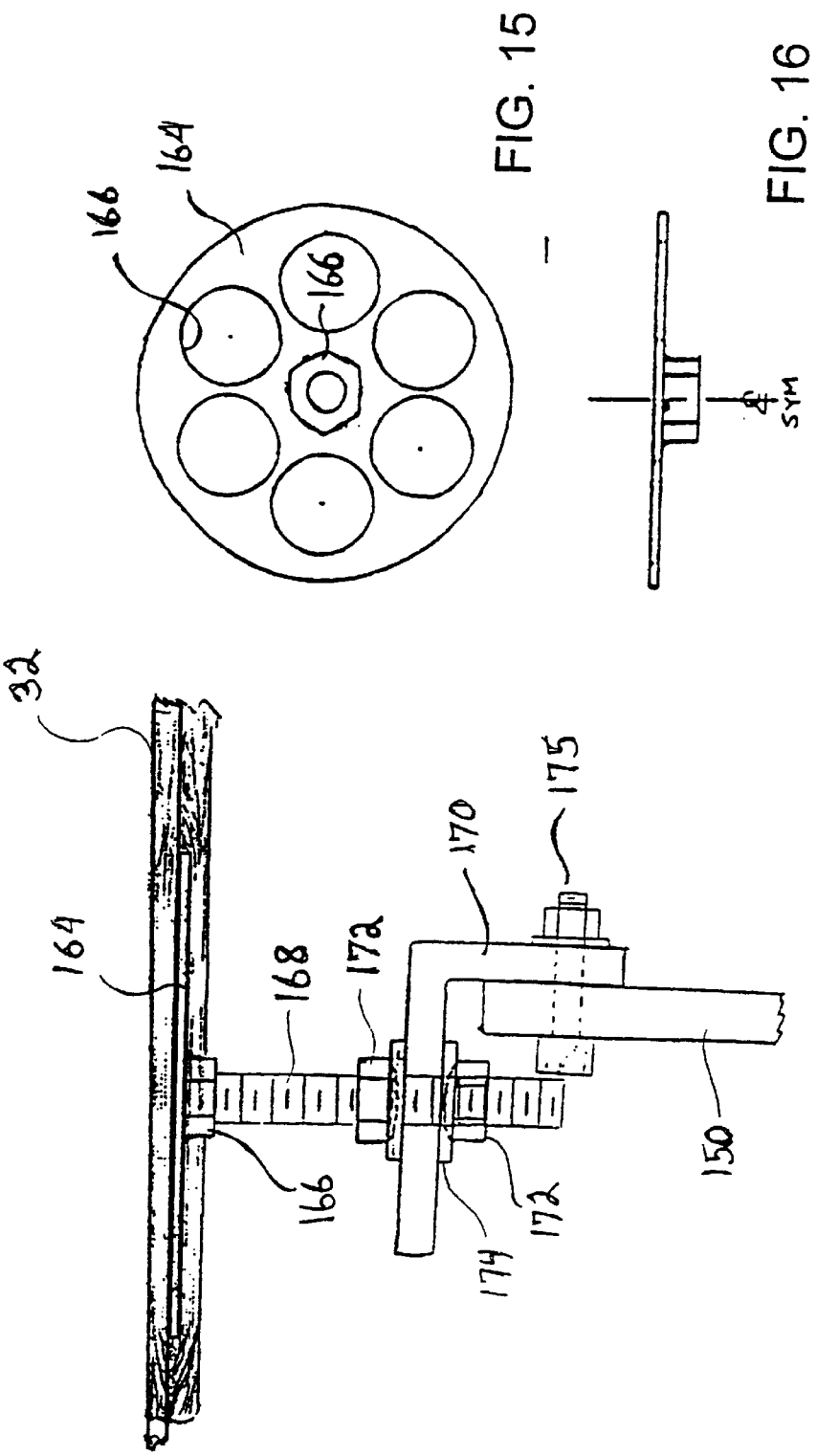

HYBRID LAY-UP TOOL

REFERENCE TO RELATED APPLICATIONS

The present application is a divisional application based upon U.S. patent application Ser. No. 09/072,716, filed May 5, 1998, now U.S. Pat. No. 6,012,883 which claims priority from U.S. Provisional Patent Application 60/045,742, filed May 6, 1997.

The present application is also a continuation-in-part application based upon U.S. patent application Ser. No. 08/629,120, filed Apr. 6, 1996, now U.S. Pat. No. 5,746,553.

TECHNICAL FIELD

This invention pertains to lay-up tools on which composite parts are made, and more particularly to a process for making a hybrid lay-up tool having a composite face sheet mounted on a supporting structure with the datum plane of the face sheet substantially parallel to the datum plane of the supporting structure.

BACKGROUND OF THE INVENTION

Composite parts have become commonly used throughout industry because of their engineering qualities, design flexibility and low weight. In particular, honeycomb composite parts having a honeycomb core bonded between two composite face sheets provide excellent strength and stiffness to weight ratios that make them particularly valued and widely used in the aerospace industry. However, despite the recognized benefits of this type of parts and their wide use, they have been relatively expensive, in part because the manufacturing processes for producing these parts were clumsy and difficult to use, resulting in high reject and rework rates for composite parts.

The standard process for making composite parts included laying up a tool-side skin, usually several plies of resin-impregnated fiberglass or graphite cloth, on the surface of a tool known as a "bond assembly jig" or BAJ. If the part was to have a honeycomb core, the honeycomb material was cut and fitted onto the tool-side skin and the assembly is covered with a vacuum bag from which the air was withdrawn with a vacuum source. The bagged assembly was inserted into an autoclave and reconnected to the vacuum source while it was heated to cure the resin in the tool-side skin plies and bond the honeycomb to the skin. The bagged assembly was then removed from the autoclave and unbagged.

The part was then machined to shape the honeycomb core to the desired configuration. The machining was performed by an CNC machine tool such as a gantry mounted robot, but it was not possible to perform this machining operation with the part on the BAJ because it had no means for indexing to a machine bed, and there are no provisions for holding the lay-up assembly on the tool face of the BAJ. More importantly, there was no relief in the tool face into which the cutters could project when edge routing, drilling, or other cutting operations. Instead, the part was broken out of the BAJ, and transferred to another tool known as a "bond mill fixture" or BMF. The BMF had a part support surface that was designed to have the same profile as the BAJ and also was provided with vacuum ports and hold down mechanisms intended to hold the part in place on the BMF while the honeycomb core material was machined to sculpt it to the desired shape The BMF also had index features for accurately locating it on the machine tool bed, and it had an accurately machined "A" datum plane for orienting the part support surface of the BMF relative to the machine tool bed to facilitate accurate machining by CNC machine tools.

The partially made part was removed from the BMF and the honeycomb was cleaned to remove dust from the cells. The cleaned part was repositioned onto the BAJ where it was reattached with clamps and hold-down devices. The plies for the bag-side skin were laid over the honeycomb core and were recovered with another vacuum bag. The BAJ was reinserted back into the autoclave where the bag-side skin was bonded to the honeycomb core. After curing, the cured part was again removed from the BAJ and repositioned back onto the BMF for final trim.

That time consuming, costly and error-prone process has been replaced by a far more efficient and accurate process, described in U.S. patent application Ser. No. 08/629,120 filed on Apr. 8, 1996 by Dwight Engwall and entitled "Dual Purpose Lay-Up Tool". It provides a single tool having a face sheet with a facing surface configured to a desired shape of one surface of a part to be made on the tool. A groove in the face sheet opening in its facing surface is filled with a sacrificial material that forms a top surface flush with the facing surface of the tool body. The sacrificial material is a foaming composition that forms a hard smooth skin flush with the facing surface of the tool body. Parts are made by laying a tool-side skin or laminate on the face sheathed bonding the tool-side skin to the flush surface of the sacrificial material in the peripheral groove. Honeycomb core may be placed on the skin and the assembly is bonded and/or cured with the tool-side skin conforming to the surface of the tool. After curing, the tool is removed from the autoclave and repositioned on a bed of a CNC machine tool where the honeycomb core is machined to the desired shape using a suitable cutter, and the core is vacuumed to remove the dust. The plies for a bag-side skin are applied to the machined surface of the core and the assembly is cured. After cure, the tool is accurately relocated on the CNC machine tool bed and a peripheral edge is cut around the part using a cutter on the CNC machine tool. The controller of the machine tool is programmed to direct the cutter around the peripheral groove. The cutter projects into the peripheral groove and engages the full thickness of the part to cut the peripheral edge. After edge routing, the finished part is removed from the tool. The part stays on the tool for the entire manufacturing process, thereby eliminating the usual coordination problems that occur when the part was moved between tools for different manufacturing steps.

This invention eliminated the use of two separate very costly tools, and it eliminated much of the hand manipulation of the part previously required during removal from and positioning onto the two tools. The particular difficulty of registering large flexible composite parts onto the tool on which it was being repositioned was eliminated because the part stayed on the same tool throughout its fabrication. Likewise, a partially fabricated part having only one skin was not pulled out of shape by the stresses in the skin induced during cure, because the part remains bonded to the tool face in its original laid-up position. Subsequent machining or drilling operations on the part are performed precisely at the designated position since the part is positioned on the tool exactly where it belongs. The usual quality control procedures such as statistical process control and the like are thus now possible in configuration quality control for parts made by this process. Thus, in an environment wherein dimensional control and certainty of manufacturing parts within statistically determined tolerances is critical to the ability to manufacture products at rates that are important to the commercial success of the business, the "Dual Purpose Lay-Up Tool" invention disclosed in the above mentioned Patent Application has made a significant contribution to industrial efficiency and quality of manufacture of large composite parts.

The dual-purpose tools are made of Invar 36, an alloy of iron and nickel that has a coefficient of thermal expansion nearly identical to that of graphite-epoxy composite material. The Invar face sheet is bump-formed or cast to near net shape and attached to a "egg crate" base structure by welding. The base structure with the attached face sheet is positioned on a CNC machine tool bed and the surface of the face sheet is completely machined to provide a smooth surface with the proper profile. The machine tool is under the control of a machine controller using a part program based on the reverse of a digital model of the part to be made on the tool. The substantially continuous groove is then machined into the finished face sheet, as described in the application noted above. The resulting tool is durable and reliable, and repeatably produces parts well within the tolerances of the part specification.

The Invar face sheet on the dual purpose tools, while durable and effective for producing high quality parts, is heavy and expensive. Invar is a dense material and a large amount of it is needed to make tools on which large parts are made. The weight of such tools can exceed the load capacity of lifting and transport equipment normally available in a factory, necessitating the purchase of special lifting and transport equipment, which adds to the cost of the parts.

The manufacturing time for making dual purpose tools of Invar is long because of the time-consuming forming or casting steps and the extensive machining that is required.

The specific heat of Invar is high and significantly prolongs the time for the autoclave or oven to reach curing temperature for the composite material part laid up on the tool. The prolonged heat-up time is expensive both in terms of energy costs and in process time for making the parts.

It has been known to make lay-up tools of composite material that has the same coefficient of thermal expansion as the parts to be made. Graphite-epoxy composite tools have been made for many years, and newer material that do not degrade at cure temperature like epoxy have become available and are becoming more widely used as their benefits become recognized. However, the art has never known a composite lay-up tool that can be produced in multiple copies and has the capability to producing a completely laid-up, cured and edge-trimmed part made entirely without removing the part from the tool.

Thus, the practice of making laid-up composite parts on "dual-purpose" tools could be greatly improved if there were available a process for producing multiple copies of dual purpose tools based on a single master tool. The copies would preferably be made quickly, inexpensively, with a high degree of precision, and have a low specific heat to allow the cure cycle for the part in the autoclave to be as short as possible. They would be made with a process that has the capability of accurately reproducing accurately place reference features including an "A" datum plane which establishes the height and orientation of the tool face sheet over a machine tool bed, indexing features such as a "spud" and "sine key".

SUMMARY OF THE INVENTION

Accordingly, it is an object of this invention to provide an improved process of fabricating hybrid tools for manufacturing bonded or cured parts from constituent elements, such as face skins or laminates, honeycomb core and resin preimpregnated fabric, that produces parts having greatly improved conformance to dimensional requirements.

Another object of this invention is to provide a hybrid tool and a process for making the hybrid tool on which constituent elements of bonded or cured parts can be assembled, bonded and/or cured, and then machined, i.e. sculpted, trimmed and/or drilled, with great precision, all while on the hybrid tool in the original position at which the part was first assembled without being removed from the tool until after machining step. Still another object of this invention is to provide an improved part assembled from constituent elements bonded or cured on a hybrid tool and machined on that same tool in the original position at which it is bonded or cured without being removed from that position until after the final machining step.

These and other objects of the invention are attained in a hybrid tool which serves both as a form on which constituent materials are applied for bonding or curing into a part in a desired configuration, and for holding the bonded or cured materials in the originally applied position during subsequent machining of a peripheral edge of the part by a CNC machine tool while the lay-up tool is positioned on a bed of the machine tool. A face sheet made of composite material has a facing surface configured to a desired shape of one surface of a part to be made on the tool, the face sheet having a reference plane whose orientation and height above the machine tool bed are specified in the part program. A substantially continuous grove in the face sheet of the hybrid tool opens in the facing surface. A base structure supports the face sheet to maintain the facing surface in the desired shape. The base structure has ground-engaging pads, each having a contact surface, together defining an "A" datum plane, by which the supporting structure contacts and is supported by the machine tool bed. Attachments on the face sheet support the face Sheraton the supporting structure with the reference plane of the face sheet parallel to the "A" datum plane. The materials for the part are applied on the face sheet, are bonded or cured, and edge trimmed thereon, all while on the face sheet in the originally applied position. The edge trimming is performed by a CNC machine tool following a part program to move a cutter extending into the groove to engage the full thickness of the part. The groove corresponds in space to the position represented by the cutter path of travel in the part program by virtue of accurate relationship of the face sheet reference plane and the "A" datum plane.

DESCRIPTION OF THE DRAWINGS

The invention and its many attendant objects and advantages will become clearer upon reading the following description of the preferred embodiment in conjunction with the following drawings, wherein:

FIG. 14 is a side elevation of an attachment device by which the face sheet made on the master mold shown in FIG. 13 is attached to the base structure;

FIG. 15 is a plan view of the attach plate on the attachment device shown in FIG. 14;

FIG. 16 is a side elevation of the attach plate shown in FIG. 15; and

DESCRIPTION OF THE PREFERRED EMBODIMENT

Figure 1:
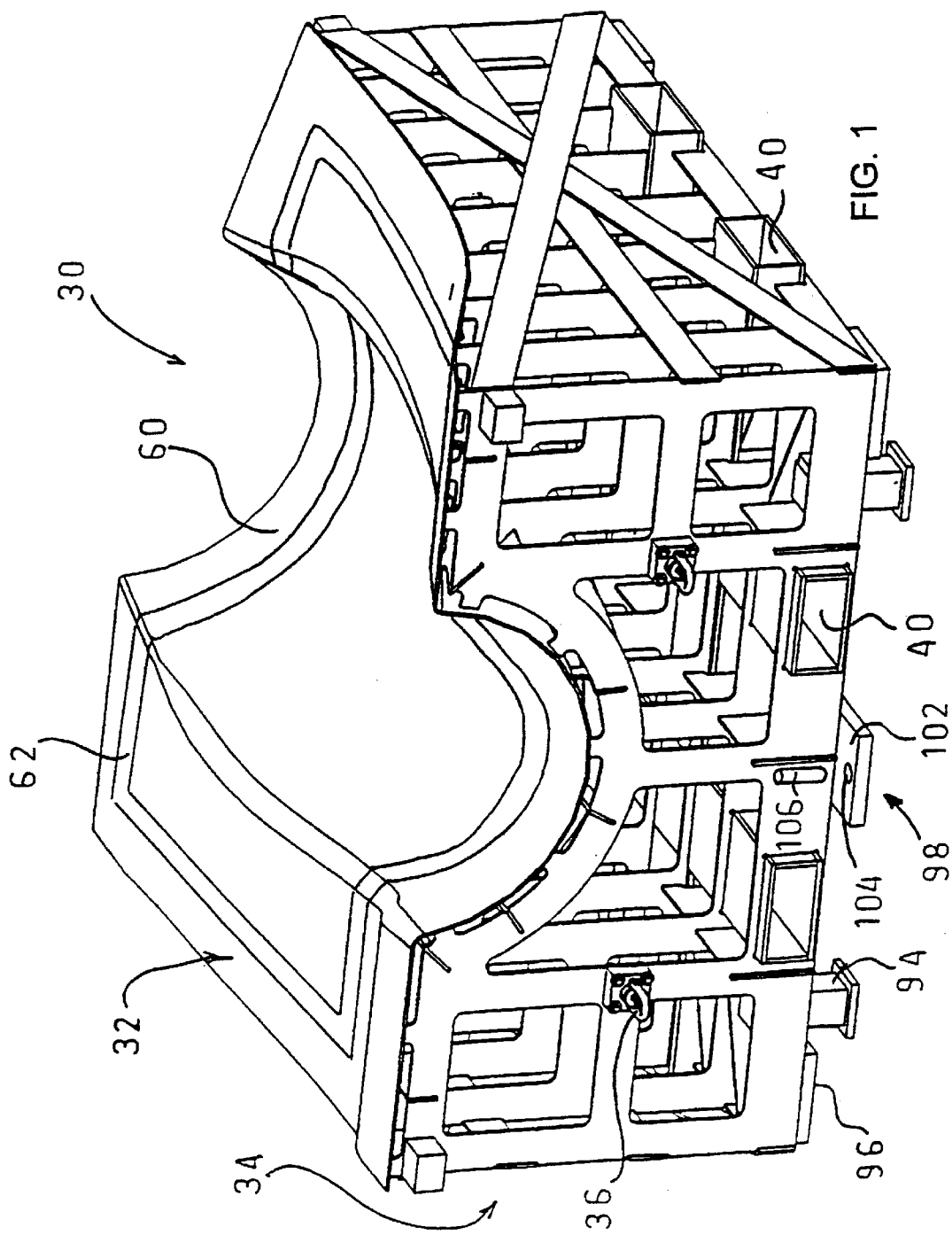
FIG. 1 is a perspective view of a hybrid dual purpose lay-up tool in accordance with this invention.

Turning to the drawings, wherein like reference numerals identify identical or corresponding elements, and more particularly to FIG. 1 thereof, a dual purpose lay-up tool 30 is shown having a tool body such as a face sheet 32 supported by a base structure 34. The face sheet 32 is made of a composite material that is compatible with the constituent materials of the part, in terms of chemical and physical properties. For example, the face sheet 32 preferably should have a coefficient of thermal expansion that matches that of the constituent materials of the part, particularly the layer placed in contact with the top plate (usually referred to as the "tool-side skin") If the tool side skin is carbon fiber fabric preimpregnated with epoxy resin, a commonly used material, the face sheet 32 could itself be carbon fiber/epoxy resin composite material, or preferably is a carbon fiber/bismaleimide material such as the material sold by Cytec Engineered Materials in Anaheim, Calif. under the name "Dura Tool 450". The carbon fiber/bismaleimide material has a coefficient of thermal expansion closely matching that of carbon fiber/epoxy resin composite material of which the parts are commonly made.

The support structure 34 may be any suitable design, although the preferred embodiment is the conventional "egg crate" design shown in FIG. 1. It is made of planar Invar plates 35 slotted and slip fit together with cross members 37 in an open array shown in FIG. 1, then welded together at the intersections of the plates 35 and cross members 37. Another support structure which would be suitable would be one made with composite tubes attached together with fittings shown in U.S. Pat. No. 5,100,255, the disclosure of which is incorporated herein by reference. The "egg crate" design is preferred because it can be assembled very quickly with a high degree of precision, is inexpensive, and does not suffer from thermal degradation like epoxy.

The support structure 34 has transport accessories to facilitate movement of the tool 30 in the factory. The transport accessories in the preferred embodiment shown in FIG. 1, include lift rings 36 fastened two each to the front and back sides of the support structure 34 for attachment of lifting cables which are engaged with the hook of an overhead crane for lifting and ferrying the tool 30 about in the factory. Another transport accessory which can be used in place of the lift rings 36, or preferably in addition to them, are fork lift tubes 40 built into the support structure 34 as shown in FIG. 1. The fork lift tubes 40 receive the spaced tines of a fork lift by which the tool 30 may be lifted and moved about the factory.

Figure 2:
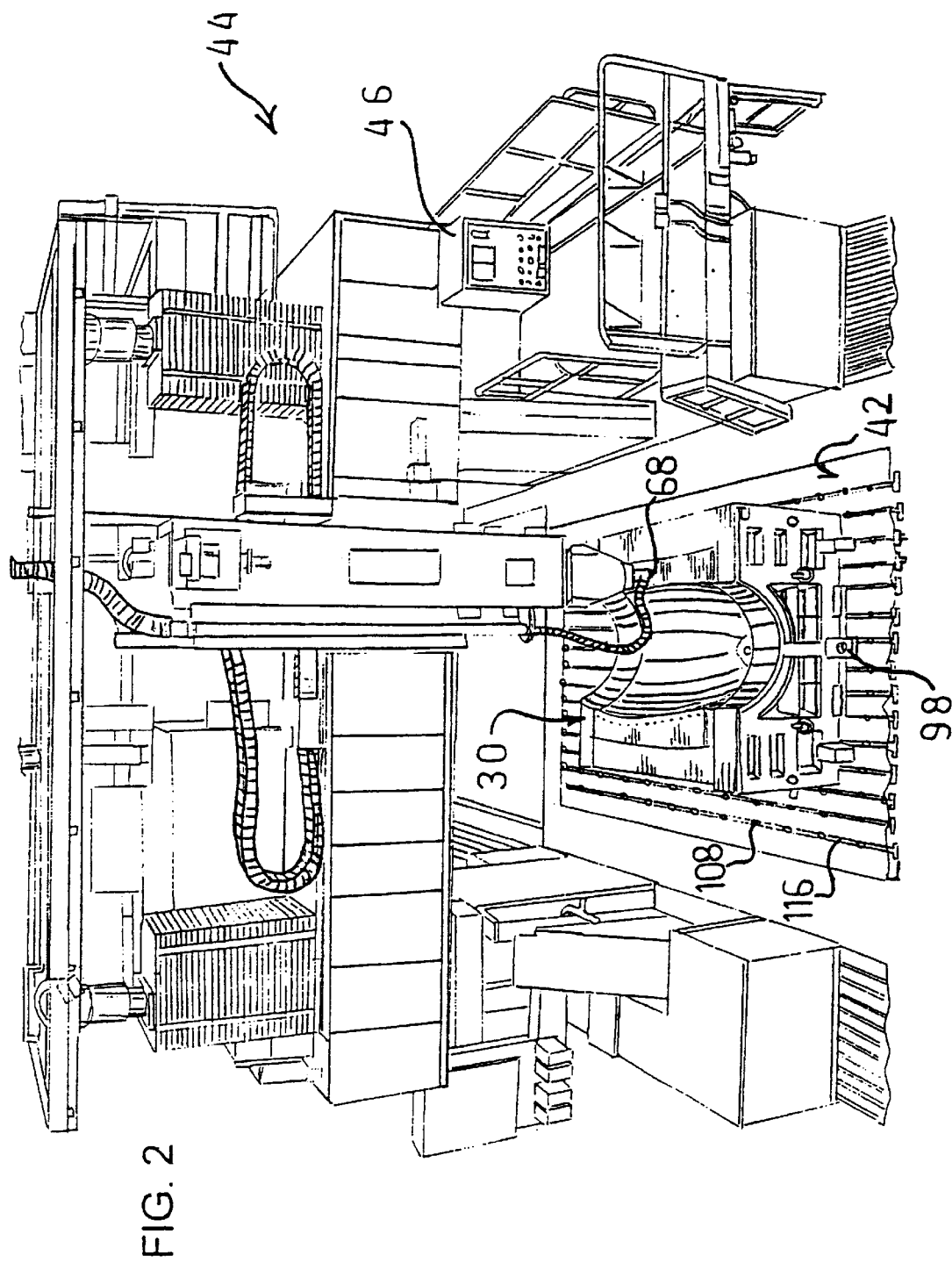
FIG. 2 is a perspective view of a hybrid lay-up tool indexed to the base of a gantry mounted machine tool.

Location and attachment devices are provided on the support structure 34 for accurately indexing and positioning the tool 30 on a base 42 of a machine tool such as a five-axis gantry machine tool 44 shown schematically in FIG. 2, and for fastening the support structure 34 to the machine tool bed 42 in the desired position. The machine tool 44, under control by an machine tool controller 46, performs machining operations on the part laid up on the tool 30 after the part is cured, and also serves important functions in fabricating the hybrid tool 30. The location and attachment devices facilitate precise positioning of the hybrid tool 30 at a known position on the bed 42 so the machine tool controller 46 can drive the cutting tool in the machine tool to the correct position for accurate machining of the part. The location devices include set points (also known as "spuds"), sine keys, and tool balls, the use of which are described in detail below. Use of these devices makes it possible to position the hybrid tool 30 on the bed 42 of the machine tool with extreme accuracy and to check that position and adjust the machine program to conform to the actual position of the face sheet 34 of the tool 30, thereby facilitating accuracy in the subsequent machining operations, since the position of the tool 30 and the part laid-up thereon are known accurately.

The attachment devices by which the tool 30 is secured to the machine tool bed 42 may be any conventional devices known in the art for fastening a workpiece to the bed of a machine tool. In this embodiment, the attachment devices are conventional toe clamps, the design of which is known to those skilled in the art.

Figure 5:
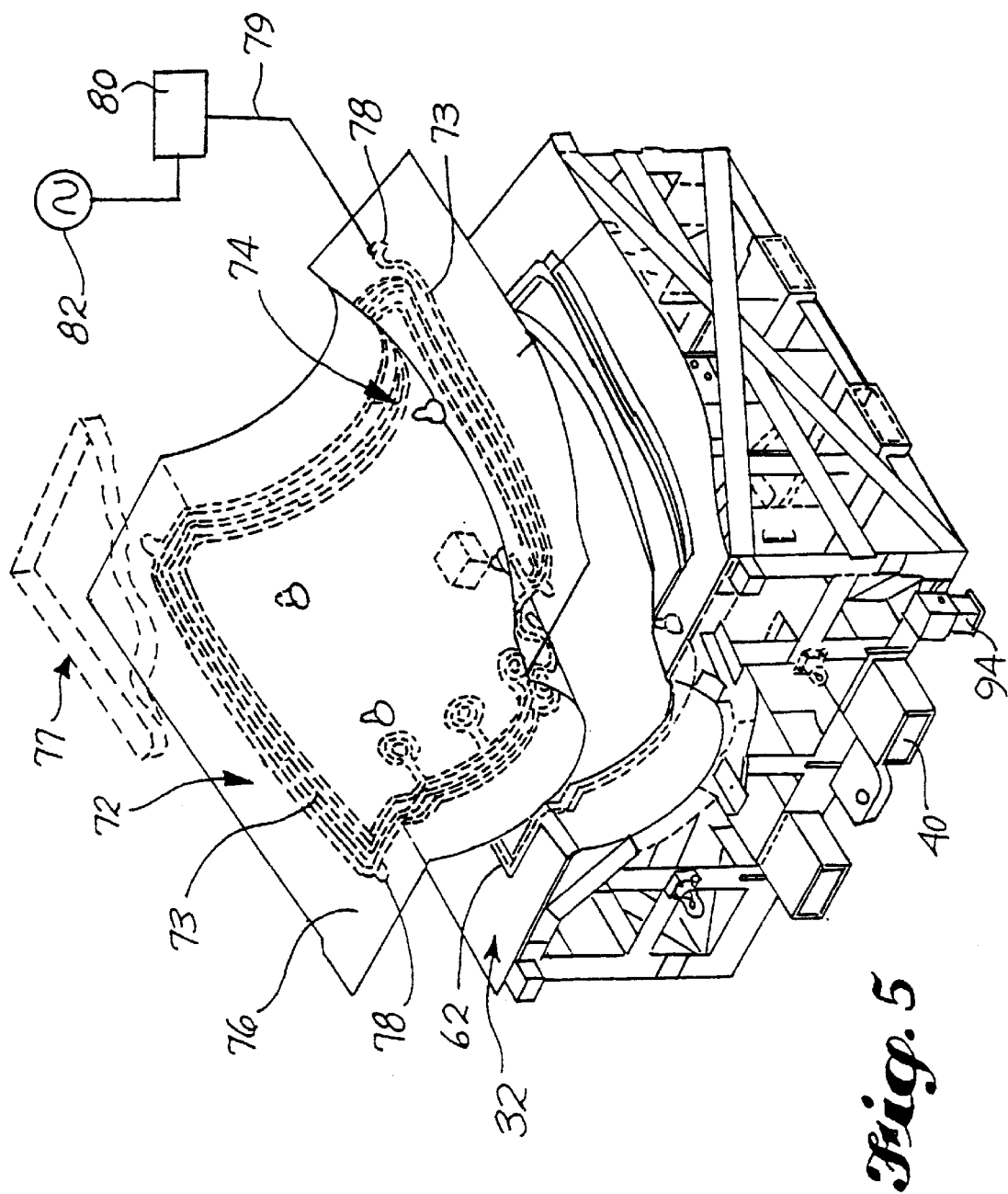
FIG. 5 is an exploded perspective view showing an electrically heated caul sheet over a tool according to this invention.
Figure 6:
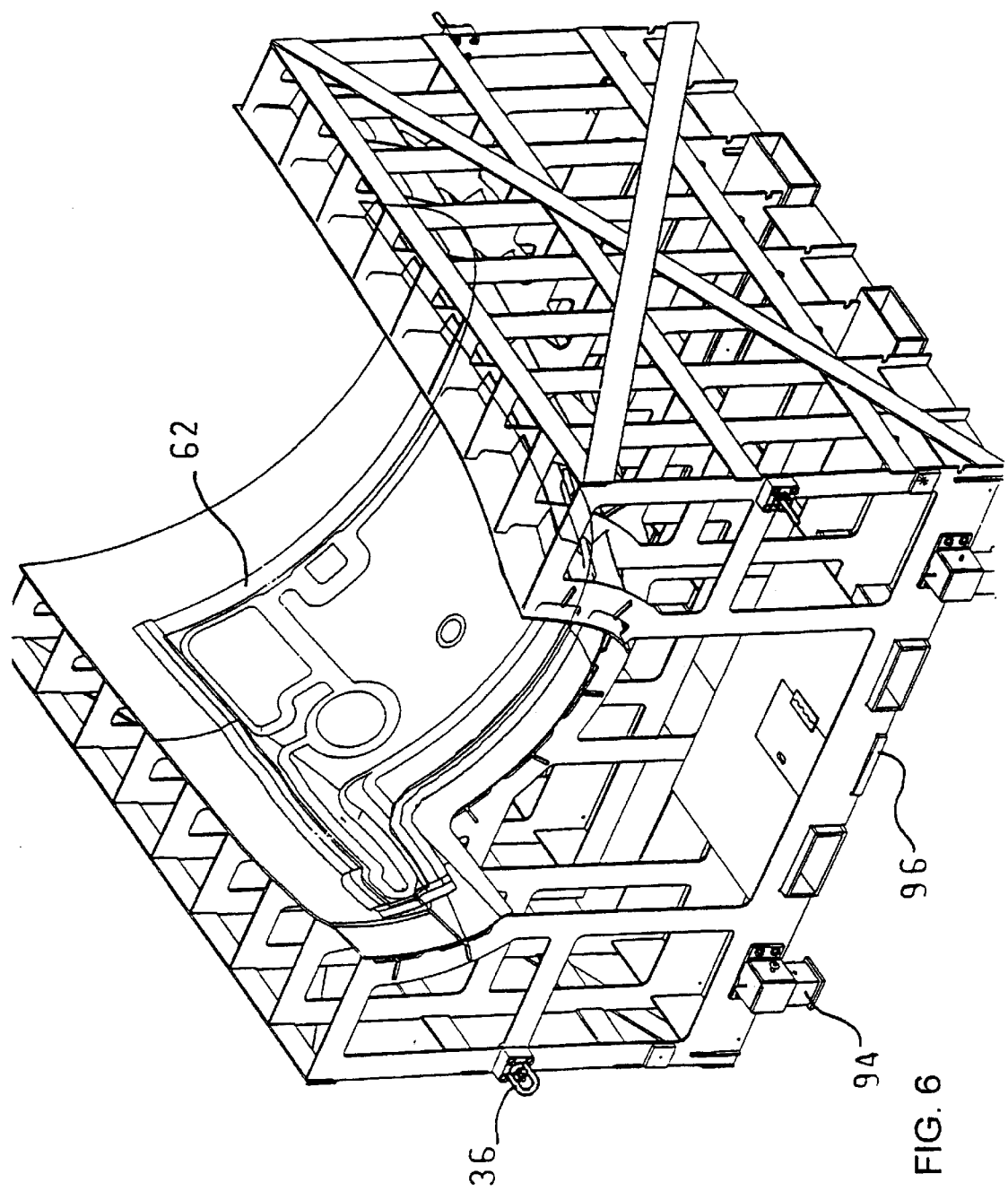
FIG. 6 is a perspective view of another form of a tool in accordance with this invention, showing recesses in the top plate of the tool for various cutouts.

The face sheet 32 has an upper upwardly facing surface 60 on which the constituent elements of the part are laid-up. The upper surface 60 is configured, by a process described in detail below, to a desired shape of one surface of the part to be made on the tool. Upwardly opening recesses are machined into the upper surface 60 of the face sheet 32 at positions corresponding to locations on the part that machining operations will be required later in the manufacturing process. The recesses include a peripheral groove 62, located on the face sheet 32 where the peripheral edge of the part will be cut, and cylindrical wells 63 (shown in FIG. 3) located on the face sheet 32 where holes will be drilled through the part. Other continuous grooves are located within the region bounded by the groove 62 where openings are to be cut out of the part. Some of the various shapes of recesses are illustrated in FIGS. 5 and 6. The recesses receive a sacrificial material 64, described below, on which the constituent materials of the parts can be laid up on the face sheet 32 flush with the upper surface 60.

Figure 4:
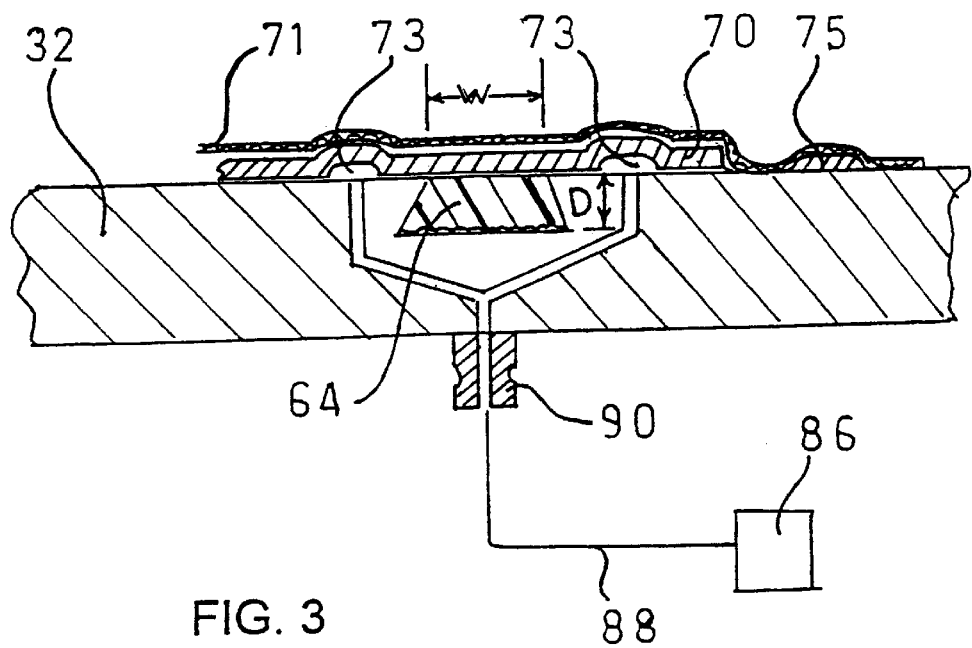
FIG. 4 is a sectional elevation of a portion of the top plate of the tool shown in FIG. 1, showing a caul sheet over the groove while the sacrificial material in the groove cures.
Figure 3:
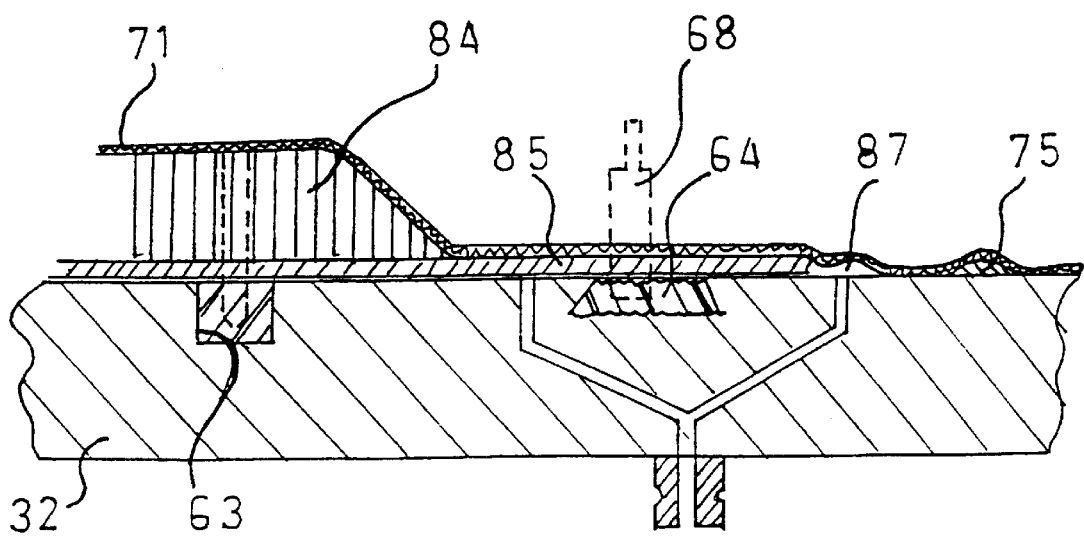
FIG. 3 is a sectional elevation of the tool face of the top plate of the tool shown in FIG. 1 with elements of a part applied and showing outlines of the cutter travel in trimming and other machining operations on the part while still mounted in the original position on the tool.

The groove 62 is preferably dovetailed in cross-section, as shown in FIGS. 3 and 4, which assists in retaining the sacrificial foam material in the groove until it is removed. After curing, the foam material has a strength of about 500 PSI which is sufficiently strong to provide a supporting surface that holds the tool-side plies flush with the surface of the tool face sheet 32 under normal circumstances. However, if greater strength is desired, one or more plies of graphite/epoxy prepreg tape may be added in the groove 62 over the foam material 64 to provide a more rigid surface that is capable, when cured, of distributing the load over a larger surface and thereby carrying a greater load. To facilitate removal of the foam material 64 from the groove 62 after removal of the part, a separate strip of resin-impregnated fabric may be inserted into the groove 62 prior to applying the foam material therein.

The groove 62 extends completely around the central portion of the facing surface 60 of the face sheet 32 on which the constituent elements of the part are to be laid up, in an area of the surface where the net edge trim will be located. Other recesses are located in areas on the tool where holes are to be drilled through the part or where other machining through the part is required. The outer peripheral groove is a "continuous" groove in the sense that it completely encircles the area on which the part is laid up. However, there may be particular part designs that require a break or a gap in the groove, hence the term "substantially continuous" groove. Preferably, the groove is just deep enough to enable a mill cutter 68 to extend below the facing surface 60 during its cutting pass so that its peripheral cutting teeth can engage and cut the full thickness of the peripheral edge of the part. The depth D of the groove 62 in this embodiment, shown in FIG. 4, is about 0.050", although it could be made deeper if the machine tool on which the cutter 68 is mounted cannot be programmed to follow the contour of the face sheet 32 with the necessary precision.

The width W of the groove 62 is selected to accommodate the diameter of the cutter 68 plus the necessary tolerance in the path of travel of the cutter 68 in the machine tool 44. An additional width of groove 62 is also provided on both sides of the kerf cut by the cutter 68 for holding the tool-side surface of the laid-up materials bonded to the sacrificial material 64 to ensure that the part does not shift during the cutting operation but remains securely fixed in place on the face sheet 32 until the cutting operation is completed and the part is ready to be removed from the tool 30.

The sacrificial material 64 can be any suitable material that can be conveniently applied to fill the groove 62 and has sufficient strength, temperature resistance and other properties to support the constituent materials during the bonding/curing operation. The preferred material used in this embodiment is B.F. Goodrich #PL657 heat expandable self-skinning foam. It is applied as a bead or a cut strip in the groove 62 and covered with a smooth molded caul sheet 70, as shown in FIG. 4. The caul sheet 70 is preferably a graphite/epoxy resin construction molded directly on the top surface of the face sheet 32 before the groove 62 and other recesses are machined therein, and is cured thereon by heating to cure temperature for the cure cycle while covered with an evacuated vacuum bag 71. Vacuum tracks 73 may be molded into the underside of the caul sheet 70 by laying a bead of sealing tape, normally used to seal the edges of the vacuum bag 71 to the tool, along both sides of the path on which the groove 62 will be machined in the face sheet surface 60. The graphite/epoxy sheets of which the caul sheet is made are laid on the tool surface 60 over the beads of tape and cure in that shape to form the vacuum tracks 73. The sacrificial material 64 is expanded and cured in the groove by covering the groove 62 with the caul sheet 70 and a vacuum bag, and sealing the edges of the vacuum bag to the facing surface 60 of the face sheet 32 with putty-like sealing tape 75 known in the art for this purpose. The vacuum bag is evacuated to a vacuum of about 10 inches of vacuum and vacuum is applied in the vacuum tracks 73 to help hold the caul sheet down against the top surface 60 of the tool over the groove 62 while the foam expands against the underside of the caul sheet over the groove 62 and then cures in the expanded condition. To expand and cure the foam, the tool 30 is place in an oven or autoclave and heated to a temperature specified by the supplier of the foam material, which is about of between 260° for about 90 minutes for the B.F. Goodrich #PL657 material.

A preferred technique for curing the foam 64 uses an electrically heated caul sheet 72, shown in FIG. 5. The caul sheet 72 has an electrical heat tape 74 fastened to the top surface 76 of the caul sheet 72 in the region over the groove 62, or embedded therein when the caul sheet 72 is made. An insulating blanket 77, shown partially in phantom lines in FIG. 5, can be laid over the top of the caul sheet 72 to reduce the heat loss to the ambient air and lower the electrical power requirements to maintain an elevated temperature of the foam 64 while it cures. Temperature sensors 78 adjacent the heat tape produce signals that are transmitted over conductors 79 to a controller 80 which monitors the temperature of the caul sheet 72 and adjusts the electrical power from a power source 82 delivered to the heat tape 74 to maintain the temperature at the desired cure temperature of the foam 64 in the groove 62. The electrically heated caul sheet 72 eliminates the need to occupy an expensive oven or autoclave during the foam cure cycle, thereby reducing the cost of the manufacturing process.

After the foam 64 has cured, the vacuum bag 71 and caul sheet 70 or 72 is removed and a release coating is applied to the tool face 60, on both sides of the groove 62, but is not applied to the sacrificial foam material 64 in the groove 62. The release coating ensures that the part will not adhere to the tool face when the time comes to remove it from the tool 30. The plies of the tool-side skin 85 of the part are applied to the tool face 60, overlapping the groove 62 and, as shown in FIG. 3, extending a short distance beyond the groove to provide an excess or selvage. If the part is a honeycomb core sandwich part, honeycomb core elements 84 are fit in place on top of the tool-side plies with an adhesive expanding foam between the elements 84. Conveniently, the same expanding foam material 64 used in the groove 62 may be used to bond the honeycomb elements 84 together.

As shown in FIG. 3, a breather strip 87 is laid adjacent the tool-side plies 85 and the vacuum bag 71 is laid over the tool-side skin plies 85 and other components, such as the honeycomb core elements 84. The peripheral edge of the vacuum bag 71 is sealed to the tool face around the outside of the groove 62 with sealing tape 75 or the like, as known in the art. The space under the vacuum bag 71 and inside the periphery of the sealing putty is evacuated by a vacuum pump 86 communicating through a vacuum line 88 with a vacuum port 90 in the underside of the tool face sheet 32 adjacent the groove 62. Conveniently, a check valve (not shown) in the vacuum port holds the vacuum while the tool 30 is transferred into an autoclave (not shown). In the autoclave, the vacuum port 90 is reconnected to the source 86 of vacuum and the autoclave is pressurized and heated, causing the preimpregnated resin in the plies to flow and then cure while any outgassing from the curing resin is evacuated through the vacuum line 88.

After the resin in the plies and components is cured, the temperature and pressure in the autoclave is reduced to room temperature and pressure, and the tool 30 is transported to the machine tool bed 42. Retractable feet 94 on the support structure 34 of the tool 30 are retracted to engage an "A"

datum surface 96 on the underside of the base structure 34 with the machine tool bed 42. This establishes the vertical position and orientation of the facing surface 60 of the tool 30 from the machine bed 42, which is a distance "known" to the machine program that controls the movement of the gantry mounted machine tool 44.

The retractable feet 94 are kept extended at all other times, that is, during storage and movement of the tool 30 and during lay-up of the skin materials and constituent materials on the tool 30 to protect the accurately ground "A" datum surface 96 from nicks or other damage that could affect the distance between the "A" datum 96 and the top surface 60 of the face sheet 32.

Figure 8:
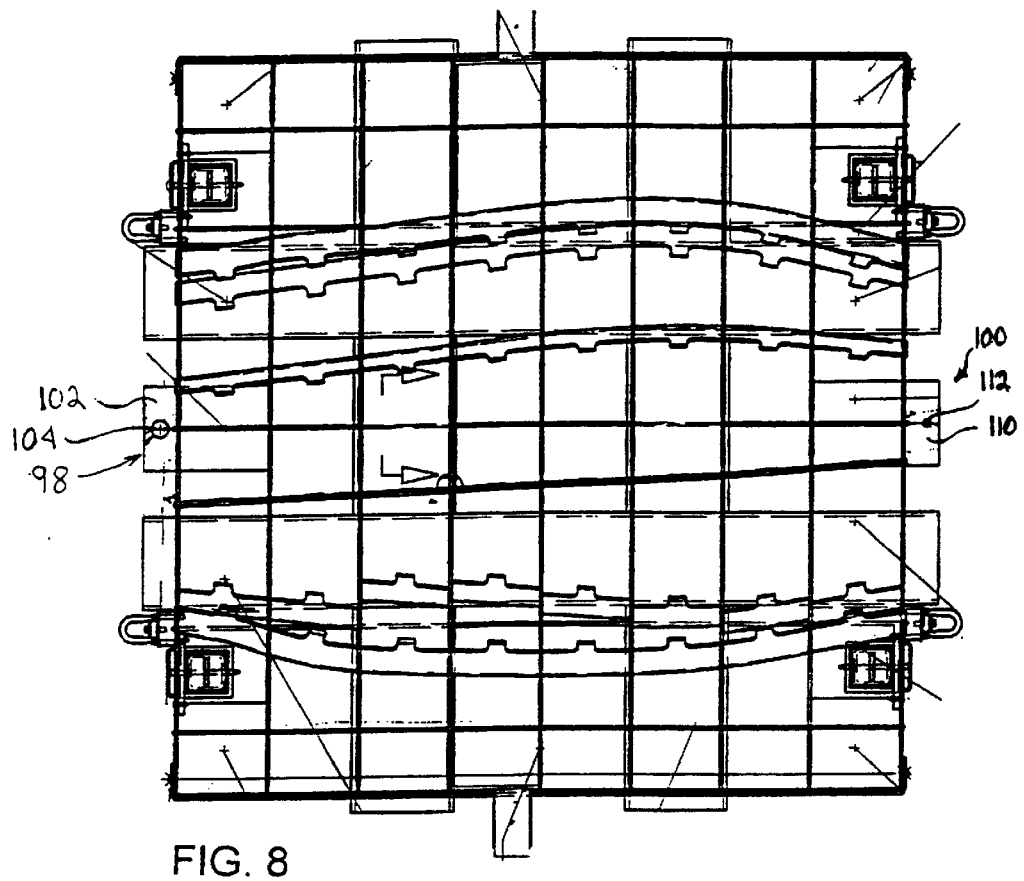
FIG. 8 is a plan view of the tool support structure shown in FIG. 7.
Figure 7:
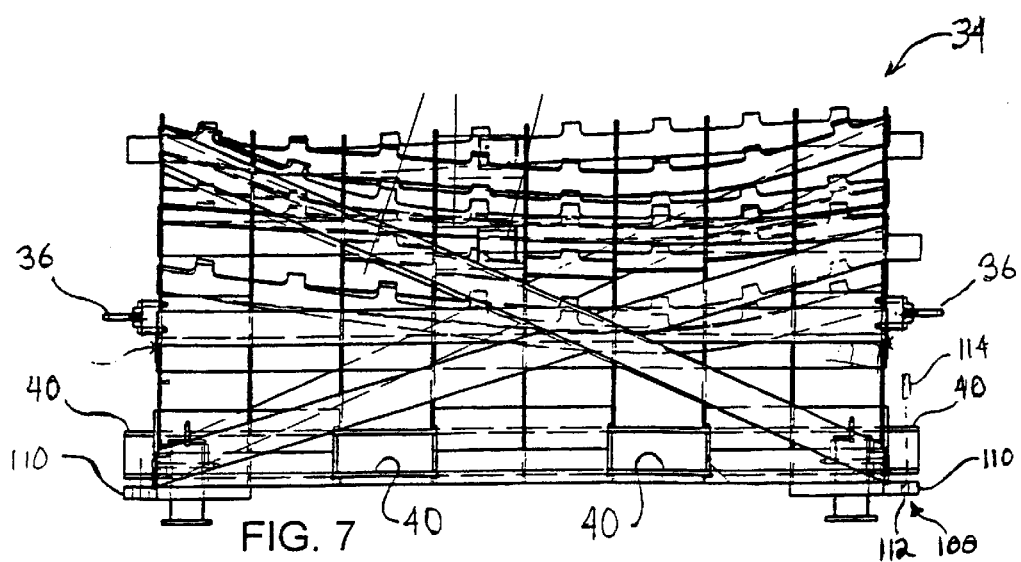
FIG. 7 is a side elevation of a support structure for a tool like the tool shown in FIG. 1.

The position and orientation of the tool 30 on the machine bed 42 are established by location devices, including a set point 98 and a sine key 100, shown in FIGS. 7 and 8. The set point 98 includes a plate 102, fixed rigidly to the underside of the support structure 34 of the tool 30 by welding or the like, and an accurately drilled and lapped vertical hole 104 in the plate 102. A precision ground pin 106, typically 2" in diameter, fits with a close sliding fit in the hole 104 and into a selected one of numerous identically sized holes 108 in the machine bed 42, shown in FIG. 2. The sine key 100, also shown in FIGS. 7 and 8, includes a plate 110 fixed, like the plate 102, to the underside of the support structure 34. A smaller vertical hole 112 is accurately drilled and lapped in the plate 110 and receives, also with a close sliding fit, an accurately ground pin 114, typically $^{13}/_{16}$" diameter, that extends down beyond the plate 110 and fits into the same T-slot 116 in the machine tool base 42 in which the hole 108 is centered. When the pins 106 and 114 are in place in the plates 102 and 11 0, extending down into the hole 108 and the slot 116, the position of the tool 30 is uniquely positioned on the machine tool base 42. Its position can be input to the machine tool control program by identifying the slot 116 and the hole 108 in which the pins are positioned. That information, together with a tool configuration data set and part configuration data set input into the machine tool controller 46, provides sufficient information to enable the machine tool controller to guide the machine tool to perform the required cutting operations.

Figure 9:
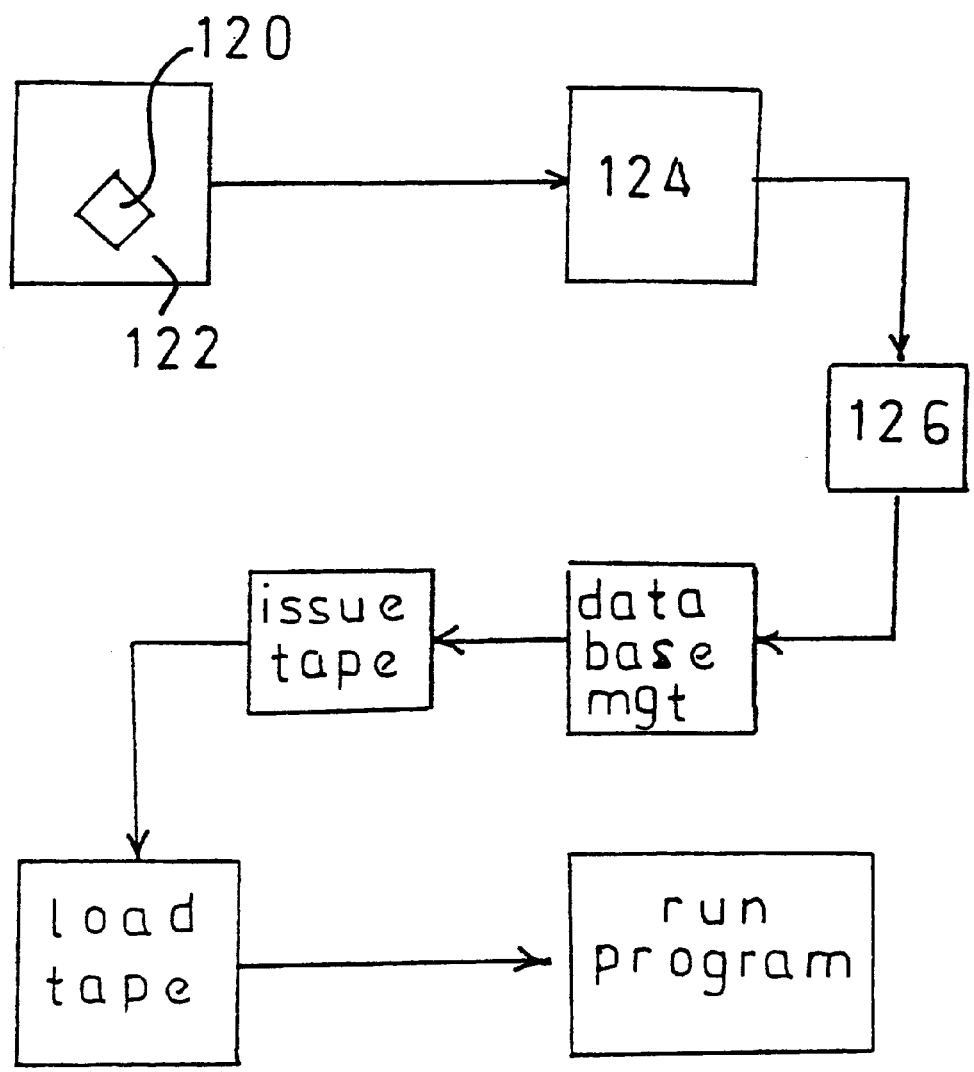
FIG. 9 is a block diagram illustrating the process of translating digital date from a digital part model to a form usable by the machine tool controller.

Turning now to FIG. 9, a process is illustrated schematically for transforming digital part data into machine instructions that can be understood and used by the controller of the machine tool 44 to enable it to perform the desired machining operations on the part such as edge routing and hole drilling. A digital part model 120 resident on a master computer 122 is provided to an NC machine programmer who produces a program 124 using the part model 120. The program contains information such as cutter type, spindle speeds, cutter feed speeds, depth of cut, number of passes and the path to be traversed by the cutter. The NC machine program is processed through a post processor 126 to produce a program in a format and medium that can be read by the machine tool controller 46. That program is logged into a data base management system for storage and retrieval when needed. The program is retrieved by the machine tool operator when he is ready to make the part. He loads it into the machine tool controller and runs the program to perform the cutting operations on the part after it is properly mounted on the machine tool base 42 and probed to confirm its position.

Some parts require that separate core assemblies be made apart from the tool-side skin and then be mated in one operation to the tool-side skin and the bag-side skin and co-cured together. For such parts, a single ply of graphite epoxy is laid on the surface 60 of the tool and the elements of honeycomb core are laid atop the tool-side ply. Strips of foam material such as the B.F. Goodrich #PL657 material are inserted between the foam core elements. A vacuum bag is laid over the assembly and evacuated with the vacuum pump 86. The tool is put in an autoclave and the temperature and pressure are elevated for the cure cycle. In this version of the process, it may be unnecessary to separately cure the foam in the groove 62 using a caul sheet if the honeycomb core elements lie over the groove and span the groove, providing support to prevent the vacuum bag from dimpling the foam in the groove 62 before it can cure. After the core element has cured, the tool is taken to the machine tool 44 and mounted on the machine tool bed 42 and indexed in place. The core element is machined to produce the sculpted shape desired for the part in which it is to used, and the periphery of the core element is cut following the peripheral groove 62 to free the core element from the tool. The sculpted and machined core element is removed and mounted on a tool-side skin in the same or another tool. A bag side skin is applied over the core element and a vacuum bag is laid over and sealed to the tool. The vacuum bag is evacuated and the tool is put in an autoclave for co-curing both skins simultaneously.

Figure 10:
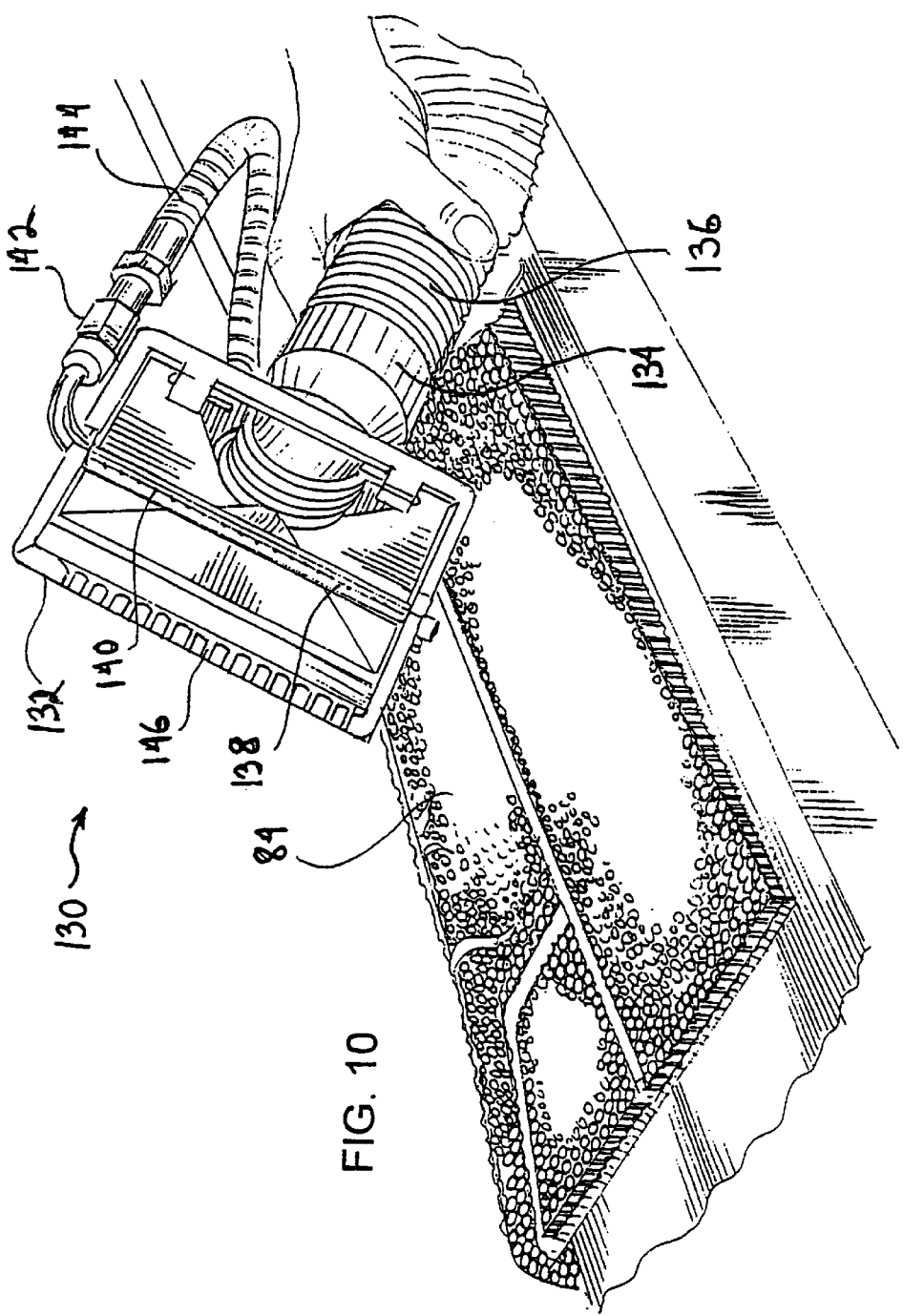
FIG. 10 is a perspective view of a vacuum tool for cleaning dust from the cells of honeycomb core elements machined on the tool shown in FIG. 1.

Machine the core element 84 to produce the sculpted profile desired for the part is an efficient and accurate technique for producing the desired shape of the core element. However, removing dust and debris from the core cells after machining has proven difficult, especially when the part remains affixed to the tool until the bag-side skin is cured. To facilitate removal of dust and debris from the core cells, a vacuum tool 130, shown in FIG. 10, is slid over the top surface of the core element. The vacuum tool has a hood 132 having a fitting 134 to which a vacuum hose 136 is attached. A pipe 138 is mounted in opposite sides of the hood 132 transverse across its opening. The pipe has a row of small holes 140 oriented toward the opening of the hood and has a quick disconnect coupling 142 at its end for attachment to an air pressure hose 144.

In operation, the vacuum tool is connected to a vacuum hose 136 from a source of vacuum, such as a shop vacuum cleaner, and an air hose 144 is connected to the coupling 142. The hood is placed with its opening on the surface of the honeycomb core and the air blowing through the row of holes 140 blows the dust out of the honeycomb cells and the dusty air is withdrawn by vacuum from the hood 132 through the vacuum hose 136. The rate of air blown through the holes 140 is less than the rate of air sucked out of the vacuum hood 132 by the vacuum source so no dust is blown out of the hood 132. A set of shallow notches 146 along the leading edge of the hood 132 allows air to be sucked into the hood and prevents a vacuum condition from building up inside the hood, which could make it difficult to move the hood about over the surface of the core element 84.

The hybrid tool 30 described above is fabricated by a process that is designed to produce a composite face sheet 32 having the correct contour and attached to the base structure 34 at the correct orientation relative to the "A" datum 96. The composite face sheet 32 is made separately from the base structure 34 and is attached to the base structure after its contour is set, so the process must enable precise alignment of the reference plane of the face sheet 32 parallel to the "A" datum plane of the base structure 34.

Figure 11:
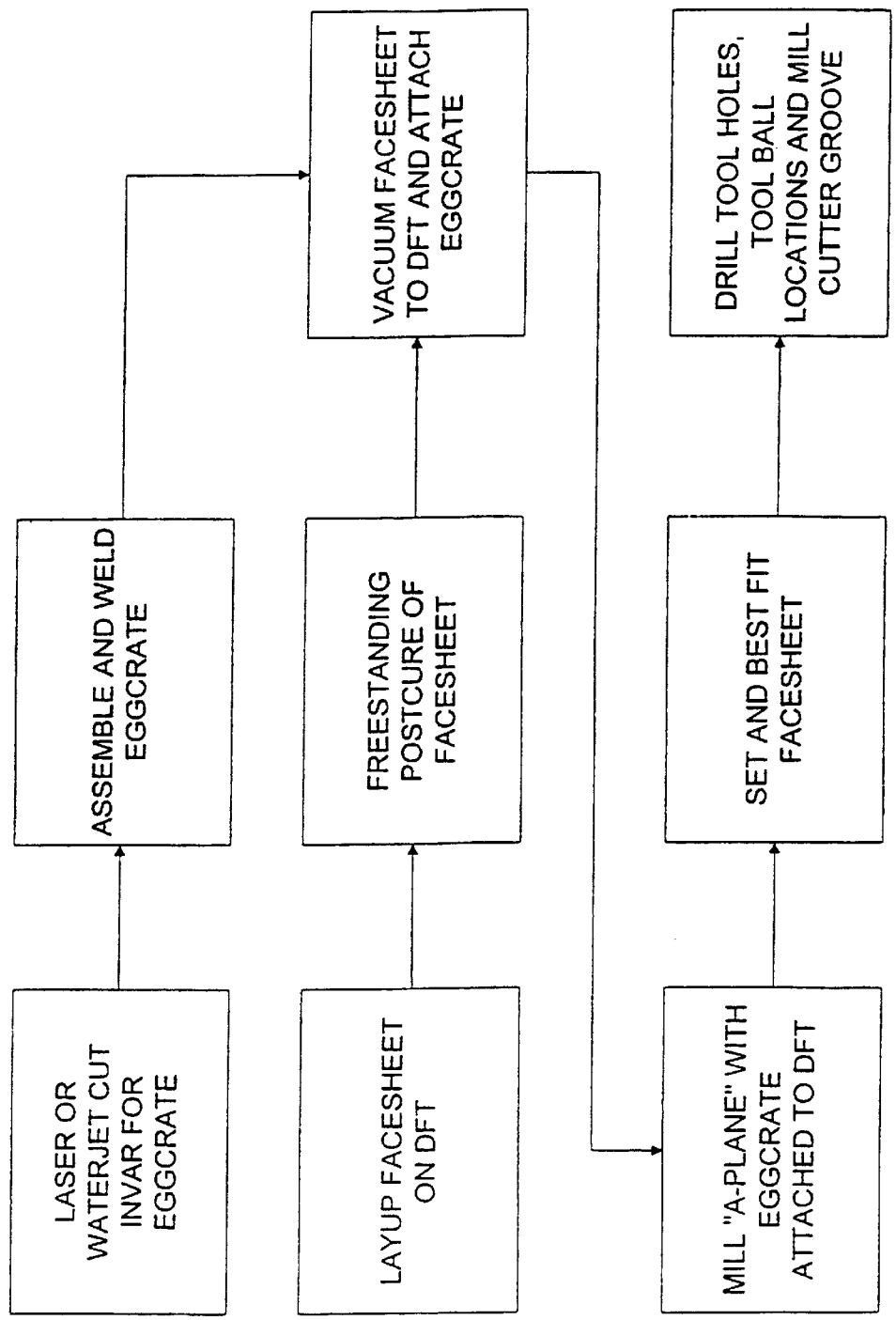
FIG. 11 is a schematic flow diagram of the process for making the hybrid tool shown in FIG. 1.
Figure 12:
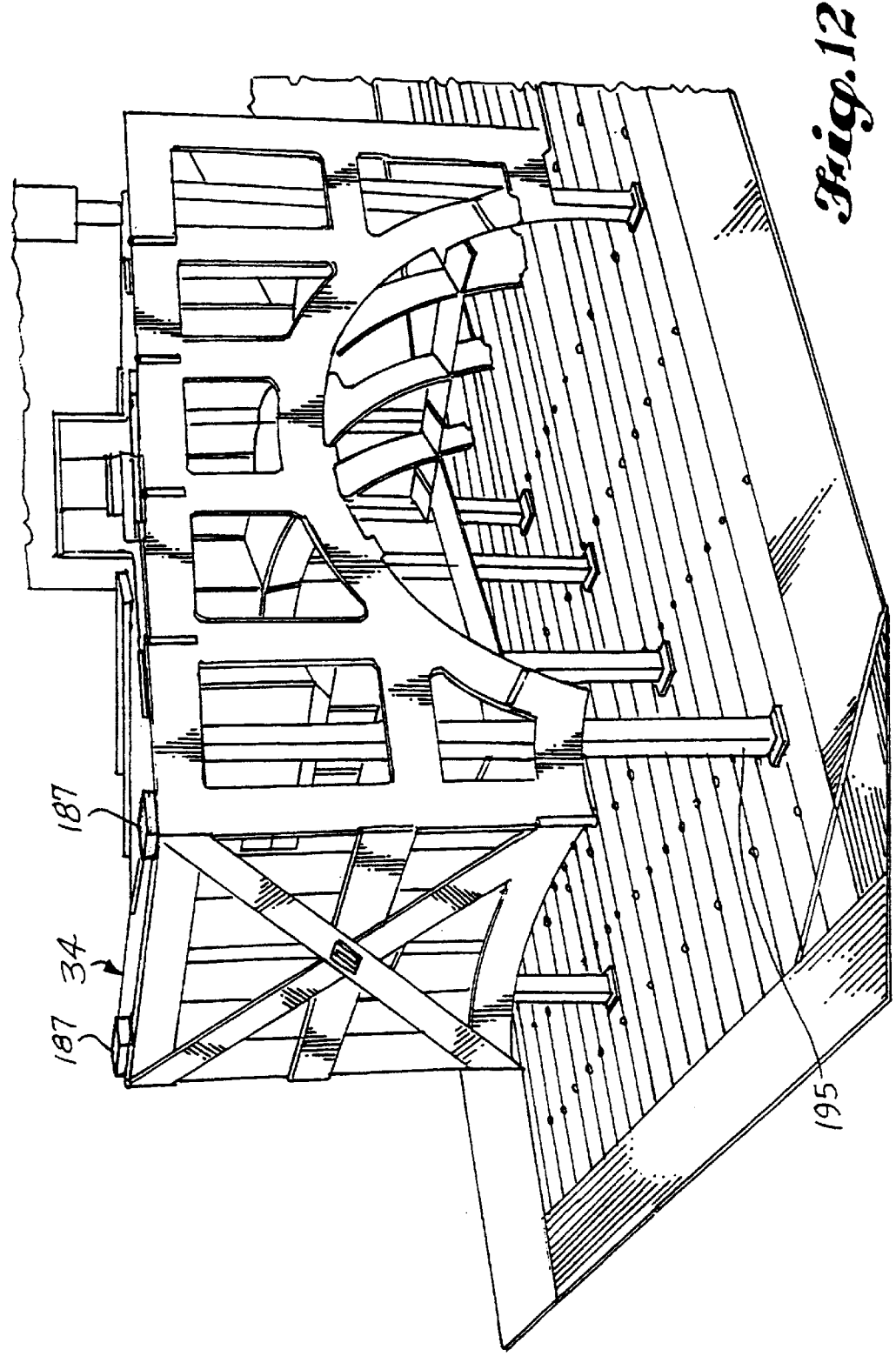
FIG. 12 is a perspective view of a base structure for a hybrid tool positioned on a machine tool bed for milling the surfaces of the ground pads.

The preferred process, outlined in the process flow diagram of FIG. 11, includes fabricating the base structure 34 and the face sheet 32 in separate parallel steps. The base structures shown in FIGS. 7, 8 and 12 are fabricated of Invar plate stock which is laser or water jet cut to provide a spaced array of parallel plates 35 held in position by the cross members 37 slip fit into slots in the plates 35 and welded in position to produce a rigid, open structure of high strength and durability. A series of "castles" 150 on the cross members 37, as shown in FIGS. 7 and 8, or on the plates 35 as shown in FIGS. 1, 6 and 12, provide stand-off attachment buttresses by which the face sheet 32 can be attached to the base structure 34, as will be described in detail below. Spacing between adjacent castles 150 is about 18 inches for a graphite/bismaleimide face sheet about 0.25"–0.30" thick.

Figure 13:
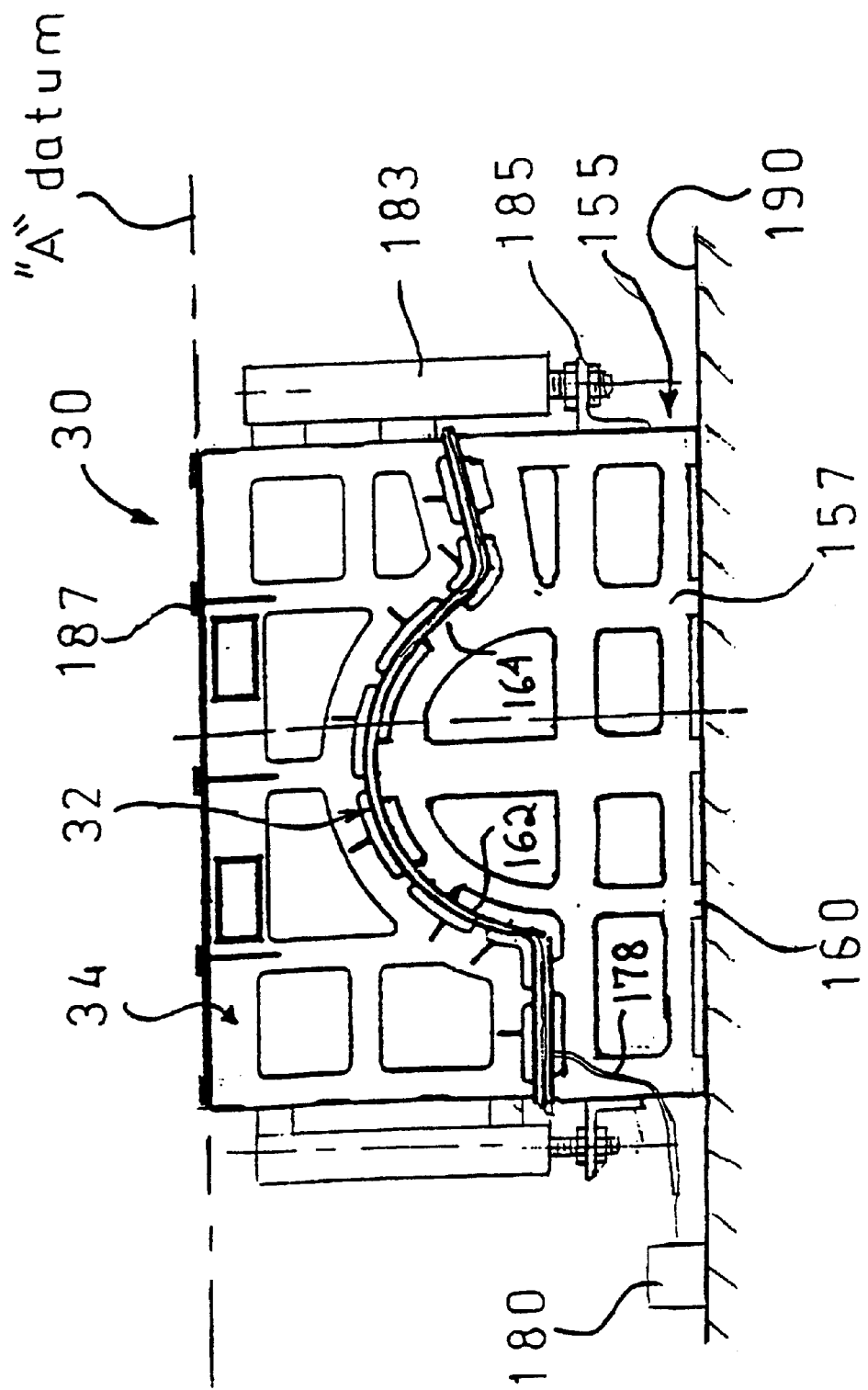
FIG. 13 is an end elevation of the base structure shown in FIG. 12 being mounted onto a face sheet made on and still attached to a master mold.
Figure 13A:
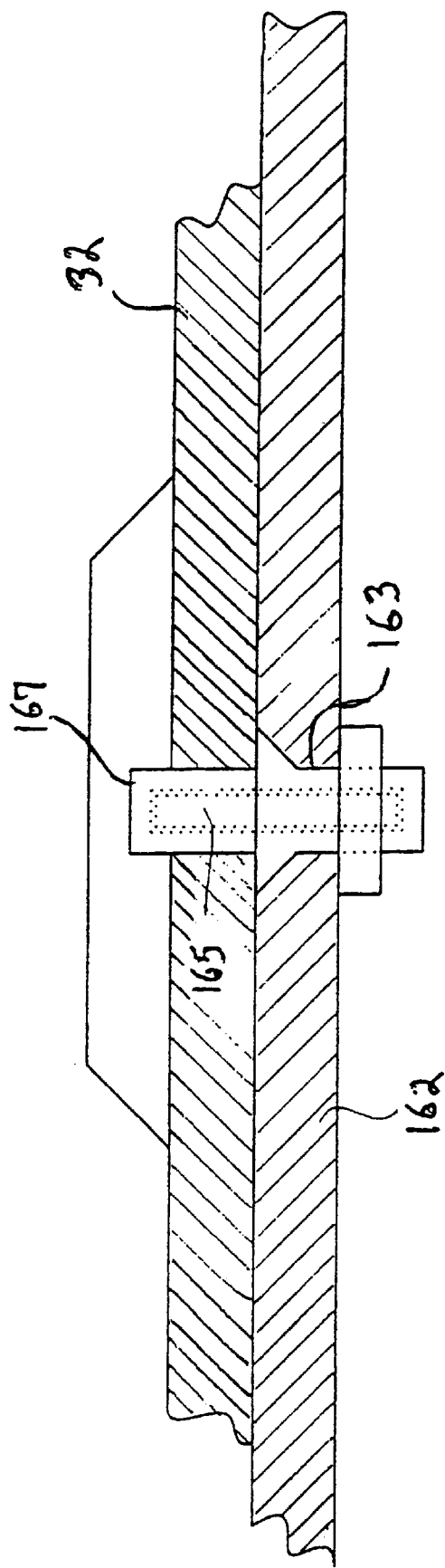

The face sheet 32 is fabricated on a master mold 155, also known as a "DFT", shown in FIG. 13. The master mold 155 is preferably made of an Invar "egg crate" type base structure 157 with support pads 160 precision machined to provide an "A" datum plane. An Invar top plate 162 is attached to the castles 164 on the base structure of the master mold 155 and is machined and polished to the exact contour of the surface of the part to be molded. The machining is done by a CNC machine tool with the "A" datum on the machine tool bed so the reference plane of the master mold face sheet is established by the machining operation. At the same time, reference features are machined into the master mold face sheet which define the reference plane and provide the means by which the reference plane is transferred to the face sheet 32 of the hybrid tool 30. The reference features are preferably three or more holes drilled in the master mold top plate 162 into which hardened bushings are installed. These holes may be later used as drill guides to drill corresponding holes in the face sheet for the hybrid tool 30 into which tool balls or laser targets can be installed for proper alignment of the face sheet 32 on the base structure 34. Alternatively, and preferably, pins are held in the bushings and are incorporated into the hybrid tool face sheet 32 as it is laid up on the master mold 155. The pins then provide the reference features in the hybrid tool face sheet for establishing the reference plane.

An alternative procedure for fabricating the master mold 155 is to use an existing dual purpose production tool, preferably one fabricated with a high degree of precision out of Invar. Reference features can be machined into the existing production tool for later transfer to the master mold 155. A master mold face sheet is laid up, debulked and cured on the production tool, and the reference features are transferred to the master mold face sheet in the same manner as described above. A master mold base structure is then attached to the master mold face sheet in the same manner as described below for making the hybrid tools. This process for making the master mold is convenient and inexpensive because the production tool is already available, but it is not preferred because of the possible introduction of minor dimensional errors into the master mold during lay-up of the master mold face sheet.

Fabrication of the hybrid tool face sheet 32 on the master mold 155 follows the lay-up procedures specified by Cytec, the supplier of the Dura Tool 450 graphite/bismaleimide prepreg materials. The surface of the master mold top plate 162 is cleaned and coated with release agent. The prepreg plies are laid up, sequentially oriented at progressive 45° positions. Every 4–6 plies, the stack of plies is vacuum bagged and debulked by vacuum evacuation of the bagged plies in an autoclave pressurized to 90 PSI. About 20 plies will produce a cured laminate of about 0.30".

After all the plies have been laid up, attachment hardware is secured to the upwardly facing surface of the face sheet 32. The upwardly facing surface will actually be the underside of the face sheet 32 when it is flipped over after attachment of the base structure 34. The attachment hardware, shown in FIGS. 14–16, includes an attach plate 164 about 3" in diameter perforated with several holes 166 through which resin can flow and the adjacent plies bulge to hold the plate 164 securely in position after cure. A nut 166 is welded to the center of the attach plate 164 and receives a threaded rod 168 through a hole in the horizontal leg of a right angle bracket 170. The rod 168 is held at a desired axial position in the bracket by opposed 172 nuts bearing against self-centering washers 174 on the top and bottom sides of the bracket. The bracket 170 has a vertical leg which is secured by a bolt 175 to the castles 150 of the base structure 34 for supporting the face sheet 32 on the castles 150.

The attach plate 164 is laid over two additional plies of the graphite-bismaleimide prepreg material on the debulked but still uncured plies of the face sheet 32, and 10 additional plies are laid over the attach plate 164, with the rod 168 extending through holes in those plies. During curing, the rod 168 is conveniently replaced with a threaded plug and sealed to facilitate vacuum bagging and to prevent resin from flowing into the threads of the nut 166.

The cure cycle includes an initial consolidation and cure at a pressure of about 90 PSI and at a temperature of about 350° for about six hours, followed by cooling and pressure release, and a final free standing post cure of the face sheet at about 440° for another six hours.

After the face sheet 32 is cured on the master mold 155, vacuum is drawn, through lines 178 connected to a vacuum source 180, at the interface of the face sheet 32 and the master mold top plate 162 to hold the face sheet 32 securely in place. The base structure 34 is hoisted by crane and positioned by four or more outrigger legs 183 to brackets 185 welded to the sides of the master mold 155. The legs 183 support the base structure on the brackets 185 and permit adjustment to roughly align the top surfaces (that is, the floor contacting surfaces after the hybrid tool 30 is flipped over) of the pads 187 on the base structure parallel to the "A" datum corresponding to the surface 190 on which the master mold 155 is sitting.

If the master mold 155 is not already on a machine tool bed, it is transported there and indexed thereon at a known orientation and position using the spud and sine key. The machining operation includes milling the pads 187 flat and parallel to the "A" datum of the master mold 155 to establish an "A" datum for the hybrid tool 30, and drilling the holes for the spud and sine key of the hybrid tool.

The hybrid tool 30 can now be removed from the master mold 155 by releasing the outrigger legs 183 from the brackets 185 and disconnecting the vacuum line 178 from the vacuum source 180. The hybrid toll 30 is lifted off the master mold 155, inverted and set on its pads or on extendible legs 94 like those shown in FIG. 1 to protect the surface of the pads 187 from damage during storage and transport. If the outrigger legs 183 would interfere with use of the hybrid tool 30, they may be removed since they have no further function.

Figure 17:
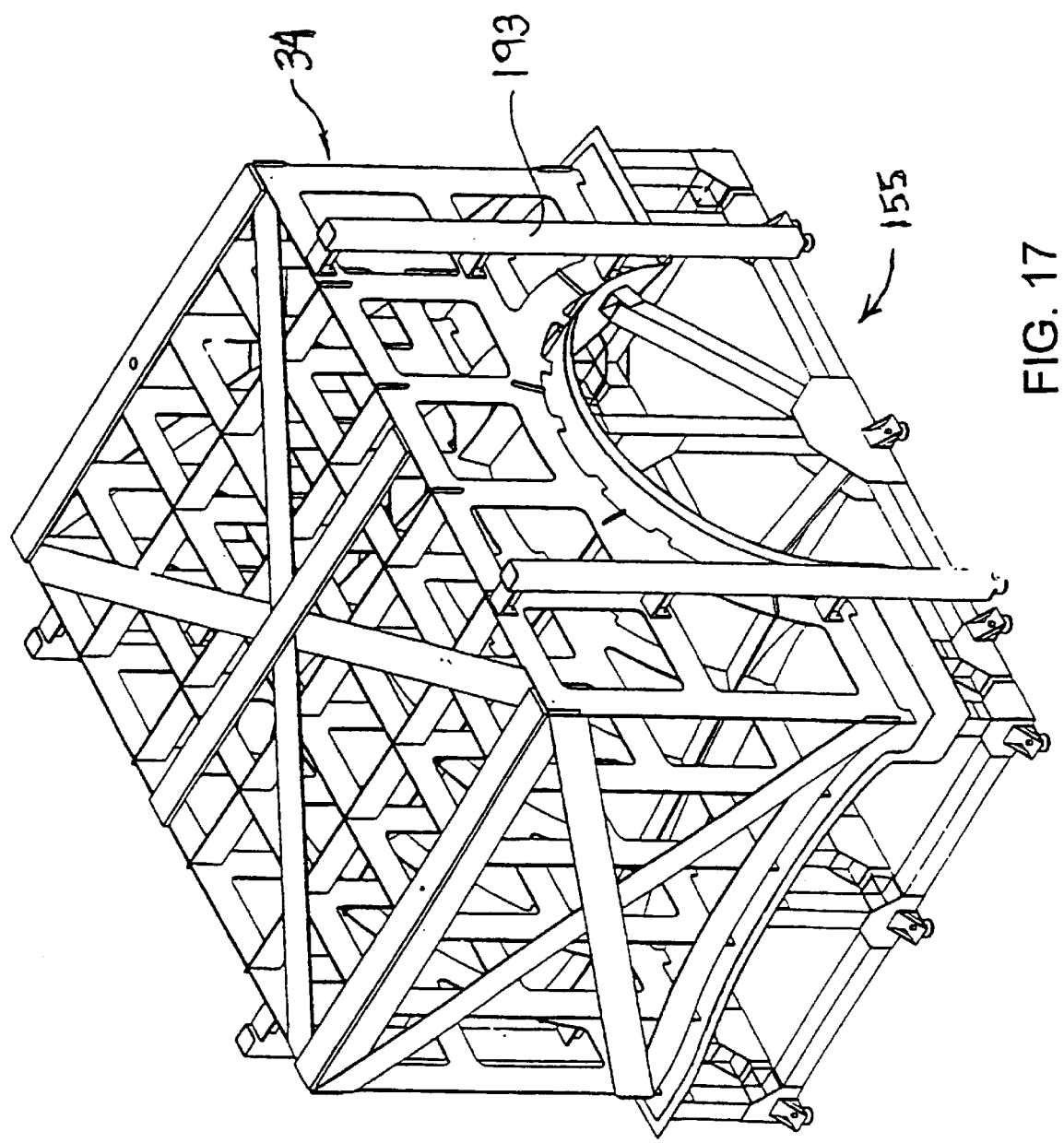
FIGS. 17 and 18 are perspective views of a master mold with a base structure supported over the master mold on ground engaging legs.
Figure 18:
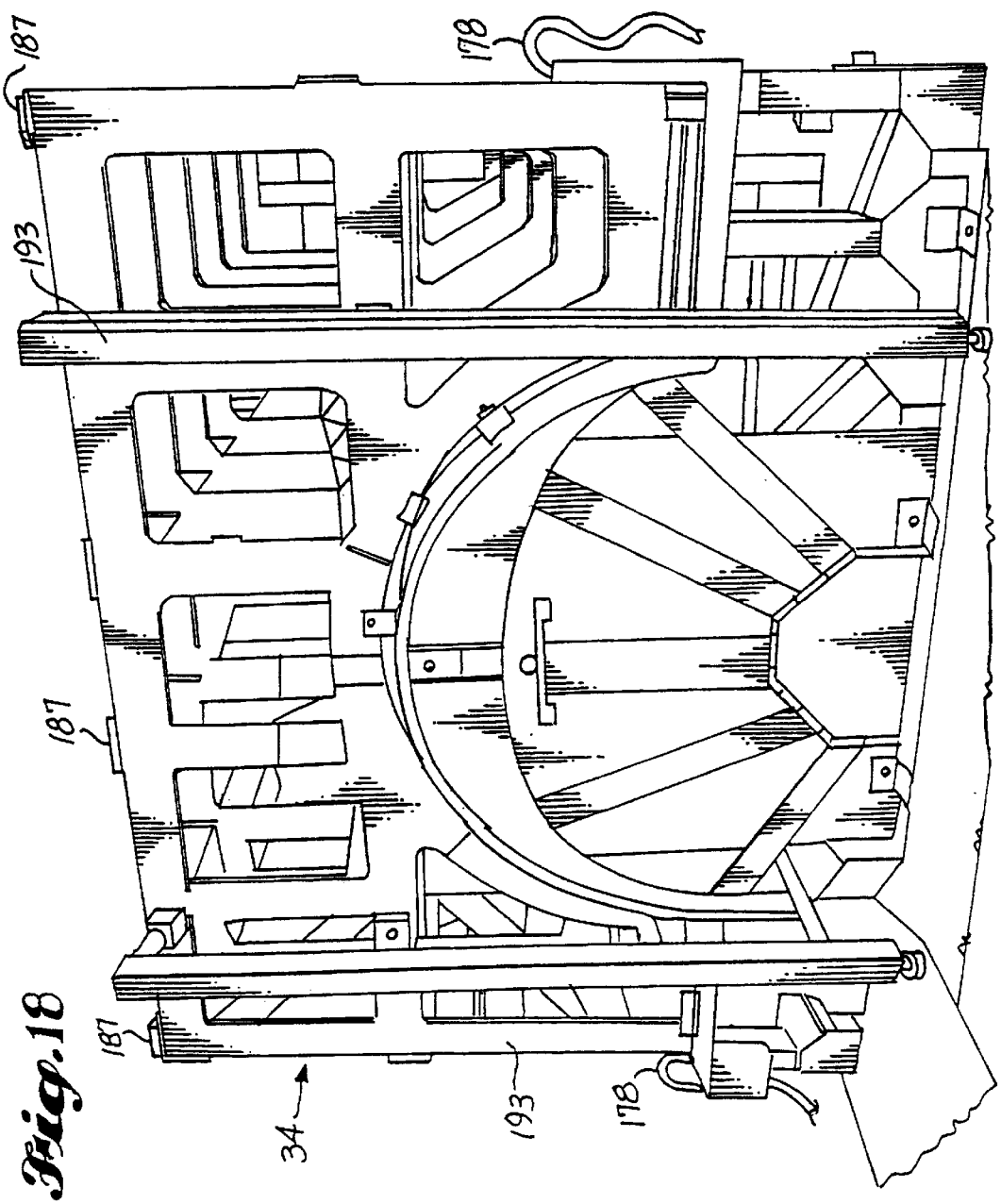

A second embodiment of the invention, illustrated in FIGS. 17 and 18, also has the order of the steps arranged so the attachment of the base structure 34 to the face sheet 32 occurs prior to the machining of the ground support pads 187.

In this embodiment, outrigger legs 193 of a length long enough to reach the floor are attached to the sides of the base support 34 and it is positioned over the master mold 155 and adjusted to roughly align the top of the base structure 34 parallel to the "A" datum. If ground support pads 187 had not already been attached, they would be welded onto the base structure 34 at this time. The face sheet 32 is attached to the castles 150 in the same manner as described above. The legs 193 now establish a temporary "A" datum plane for the hybrid tool 30, so that when it is removed with its face sheet 32 from the master mold 155, it may be transported to a machine tool bed and will stand on the bed oriented correctly with respect to the machine tool bed. The machine tool is operated to mill the ground support pads 187 flat and parallel to the machine tool bed, thereby establishing the "A" datum plane for the hybrid tool 30. The reference features were built into the face sheet as in the first embodiment, and these reference features may be used when the tool is flipped over onto its pads 187 to locate the position of the hybrid tool on the machine tool bed and accurately machine the holes in the spud and sine key.

Third and fourth embodiments of the invention reorder the sequence of steps by machining the pads 187 to establish the "A" datum plane for the hybrid tool base structure before attaching the base structure 34 to the face sheet 32.

The base structure is illustrated in FIG. 12 supported on temporary legs 195 designed to hold the base structure 34 at about the correct orientation. The pads 187 are machined flat and parallel to the machine tool bed, and the base structure is transported to the location of the master mold 155. The temporary legs 195 are removed and outrigger legs, like those shown in FIG. 18 are attached. The base structure 34 is placed over the master mold 155 supported on its legs and a laser tracker or theodolite is set up to measure the orientation of the top surface of the ground pads 187. The legs are adjusted in length until the ground pad surfaces are level and parallel to "A" datum plane of the master mold, that is, the surface on which it is resting. The attachment devices are now secured to the castles 150 of the base structure 43 and the hybrid tool is ready to be removed from the master mold 155.

The fourth embodiment establishes the "A" datum plane of the base structure 34 in the same manner as the third embodiment, but instead of attaching ground engaging outrigger legs like the ones shown in FIGS. 17 and 18, shorter legs like the legs 183 in FIG. 13 are attached. After milling the surfaces of the ground pads 187 on the machine tool bed, the base structure is transported to the master mold 155 and the shorter outrigger legs are attached to brackets on the master mold, like the brackets 185 shown in FIG. 13. The adjust nuts on the shorter outrigger legs are adjusted to align the plane of the ground pad surfaces parallel to the surface on which the master mold 155 sits, or parallel to the top surface of the bracket 185 if the brackets had been attached so they were parallel to the "A" datum of the master mold 155. After adjust the orientation of the base structure 34 so that the plane of the ground pad surfaces was parallel to the "A" datum plane of the master mold 155, the attachment devices on the face sheet are connected to the castles 150 of the base structure 34 of the hybrid tool and the hybrid tool can be removed from the master mold. As before, the spud and sine key holes can be machined by probing the reference features transferred from the master mold 155 and built into the face sheet 32 to establish the position of the hybrid tool 30 on the machine tool bed.

Thus, the invention meets the objects noted above by providing a method and apparatus for laying-up and curing/bonding the parts on a lay-up tool, and providing the means for sculpting honeycomb core and trimming and drilling the part while it is still on the original tool and still in the original position. All the registry problems in the prior art process and apparatus are removed by this invention, resulting in substantially improved manufacturing conformance to specified tolerances, and the cost of building, maintaining and storing the tooling is reduced significantly. The improved capability of small tolerance manufacturing makes possible, for the first time, use of modern manufacturing techniques with these large laid-up parts, such as statistical tolerancing and determinant assembly, thereby further improving the quality and reducing the cost of the assemblies in which the parts are used.

Obviously, numerous modifications and variations of this preferred embodiment will occur to those skilled in the art in light of this disclosure. Accordingly, it is expressly to be understood that these modifications and variation, and the equivalents thereof, shall be considered to be within the spirit and scope of the invention as defined in the following claims, wherein I claim:

What is claimed is:

1. A hybrid lay-up tool serving both as a form on which constituent materials are applied for bonding or curing into a part in a desired configuration, and for holding said materials in the originally applied position during subsequent machining of a peripheral edge of said part by a CNC machine tool while said lay-up tool is positioned on a bed of said machine tool, said CNC machine tool operating in accordance with a part program read by a CNC machine tool controller, said hybrid lay-up tool comprising:

a tool body made of composite material having a facing surface configured to a desired shape of one surface of a part to be made on said tool, said tool body having a reference plane whose orientation and height above said machine tool bed are specified in said part program;

a substantially continuous groove in said tool body opening in said facing surface;

a supporting structure supporting said tool body to maintain said facing surface in said desired shape:

said supporting structure having ground-engaging pads, each having a contact surface by which said supporting structure contacts and is supported by said machine tool bed, said contact surfaces defining an "A" datum plane;

attachments on said tool body for supporting said tool body on said supporting structure with said reference plane of said tool body parallel to said "A" datum plane;

whereby said materials for said part are applied on said tool body, bonded or cured, and edge trimmed thereon, all while on said tool body in said originally applied position, said edge trimming being performed by said CNC machine tool following said part program to move a cutter extending into said groove to engage the full thickness of said part, said groove corresponding in space to the position represented by said cutter path of travel in said part program by virtue of accurate relationship of said tool body reference plane and said "A" datum plane.

2. A hybrid lay-up tool as defined in claim 1, wherein:
   said groove is dovetail in cross-section shape on a plane perpendicular to a longitudinal axis of said groove said groove having a bottom width wider than the width at said facing surface.

3. A hybrid lay-up tool as defined in claim 1, further comprising:
   a sacrificial material filling said groove and forming a top surface flush with said facing surface of said tool body.

4. A hybrid lay-up tool as defined in claim 3, wherein:
   said sacrificial material includes a self-skinning foaming composition forming a dense hard skin flush with said facing surface of said tool body.

5. A hybrid lay-up tool as defined in claim 1, wherein:

the groove is filled with sacrificial material including a strip of fiber bonded in the sacrificial material to facilitate removal of the sacrificial material from the groove after the edge is cut around the part.

6. A hybrid lay-up tool as defined in claim 3, wherein:

said sacrificial material includes an epoxy material applied in said groove and co-cured with said materials for said part.

7. A hybrid lay-up tool as defined in claim 1, further comprising:

location devices on said tool for accurately positioning the supporting structure, whereby the machine tool may be programmed with configuration data regarding the groove and with location data regarding the supporting structure and tool body position for automatic cutting of the peripheral edge by the machine tool.

8. A hybrid lay-up tool as defined in claim 7, wherein:

said location devices include a set point and a sine key, each having accurately positioned pins for accurately positioning said supporting structure on said machine tool bed.

9. A hybrid lay-up tool as defined in claim 8, wherein each location device includes a tool ball socket for receiving a tool ball, the tool ball having a surface for engaging a probe operated by the machine tool to locate the actual position of reference surfaces on the tool.

10. A hybrid lay-up tool as defined in claim 1, wherein:

the supporting structure is an iron-nickel alloy that expands little on heating.

11. A hybrid lay-up tool as defined in claim 1, wherein:

the facing surface is made of graphite/bismaleimide material.

* * * * *